(12) United States Patent
Ciuc et al.

(10) Patent No.: US 8,184,900 B2
(45) Date of Patent: May 22, 2012

(54) AUTOMATIC DETECTION AND CORRECTION OF NON-RED EYE FLASH DEFECTS

(75) Inventors: Mihai Ciuc, Bucharest (RO); Florin Nanu, Bucharest (RO); Stefan Petrescu, Bucharest (RO); Adrian Capata, Bucharest (RO); Constantin Vertan, Bucharest (RO); Peter Corcoran, Claregalway (IE); Petronel Bigioi, Galway (IE); Eran Steinberg, San Francisco, CA (US)

(73) Assignee: DigitalOptics Corporation Europe Limited, Galway (IE)

( * ) Notice: Subject to any disclaimer, the term of this patent is extended or adjusted under 35 U.S.C. 154(b) by 20 days.

(21) Appl. No.: 11/841,855

(22) Filed: Aug. 20, 2007

(65) Prior Publication Data

US 2008/0049970 A1 Feb. 28, 2008

Related U.S. Application Data

(63) Continuation of application No. 11/674,633, filed on Feb. 13, 2007, now Pat. No. 7,336,821.

(60) Provisional application No. 60/773,714, filed on Feb. 14, 2006.

(51) Int. Cl.
*G06K 9/00* (2006.01)

(52) U.S. Cl. ........ 382/162; 348/169; 382/100; 382/118; 396/176

(58) Field of Classification Search .................... 382/162
See application file for complete search history.

(56) References Cited

U.S. PATENT DOCUMENTS

| | | | |
|---|---|---|---|
| 4,285,588 A | 8/1981 | Mir | |
| 4,577,219 A | 3/1986 | Klie et al. | |
| 4,646,134 A | 2/1987 | Komatsu et al. | |
| 4,777,620 A | 10/1988 | Shimoni et al. | |
| 4,881,067 A | 11/1989 | Watanabe et al. | |
| 4,978,989 A | 12/1990 | Nakano et al. | |
| 5,016,107 A | 5/1991 | Sasson et al. | |
| 5,070,355 A | 12/1991 | Inoue et al. | |
| 5,130,789 A | 7/1992 | Dobbs et al. | |
| 5,164,831 A | 11/1992 | Kuchta et al. | |
| 5,164,833 A | 11/1992 | Aoki | |
| 5,202,720 A * | 4/1993 | Fujino et al. | ........... 396/158 |
| 5,231,674 A | 7/1993 | Cleveland et al. | |
| 5,249,053 A | 9/1993 | Jain | |
| 5,274,457 A | 12/1993 | Kobayashi et al. | |

(Continued)

FOREIGN PATENT DOCUMENTS

EP 5224271 A2 9/1993

(Continued)

OTHER PUBLICATIONS

Soriano et al., "Making Saturated Facial Images Useful Again", 1999, SPIE, vol. 3826, pp. 113-121.*

(Continued)

*Primary Examiner* — John Lee
(74) *Attorney, Agent, or Firm* — Andrew V. Smith

(57) ABSTRACT

A technique for detecting large and small non-red eye flash defects in an image is disclosed. The method comprises selecting pixels of the image which have a luminance above a threshold value and labeling neighboring selected pixels as luminous regions. A number of geometrical filters are applied to the luminous regions to remove false candidate luminous regions.

24 Claims, 4 Drawing Sheets
(1 of 4 Drawing Sheet(s) Filed in Color)

U.S. PATENT DOCUMENTS

| | | | |
|---|---|---|---|
| 5,301,026 | A | 4/1994 | Lee |
| 5,303,049 | A | 4/1994 | Ejima et al. |
| 5,335,072 | A | 8/1994 | Tanaka et al. |
| 5,384,601 | A | 1/1995 | Yamashita et al. |
| 5,400,113 | A | 3/1995 | Sosa et al. |
| 5,432,863 | A | 7/1995 | Benati et al. |
| 5,432,866 | A | 7/1995 | Sakamoto |
| 5,452,048 | A | 9/1995 | Edgar |
| 5,455,606 | A | 10/1995 | Keeling et al. |
| 5,537,516 | A | 7/1996 | Sherman et al. |
| 5,568,187 | A | 10/1996 | Okino |
| 5,568,194 | A | 10/1996 | Abe |
| 5,649,238 | A | 7/1997 | Wakabayashi et al. |
| 5,671,013 | A | 9/1997 | Nakao |
| 5,678,073 | A | 10/1997 | Stephenson, III et al. |
| 5,694,926 | A | 12/1997 | DeVries et al. |
| 5,708,866 | A | 1/1998 | Leonard |
| 5,719,639 | A | 2/1998 | Imamura |
| 5,719,951 | A | 2/1998 | Shackleton et al. |
| 5,724,456 | A | 3/1998 | Boyack et al. |
| 5,734,425 | A | 3/1998 | Takizawa et al. |
| 5,748,764 | A | 5/1998 | Benati et al. |
| 5,748,784 | A | 5/1998 | Sugiyama |
| 5,751,836 | A | 5/1998 | Wildes et al. |
| 5,761,550 | A | 6/1998 | Kancigor |
| 5,781,650 | A | 7/1998 | Lobo et al. |
| 5,805,720 | A | 9/1998 | Suenaga et al. |
| 5,805,727 | A | 9/1998 | Nakano |
| 5,805,745 | A | 9/1998 | Graf |
| 5,815,749 | A | 9/1998 | Tsukahara et al. |
| 5,818,975 | A | 10/1998 | Goodwin et al. |
| 5,847,714 | A | 12/1998 | Naqvi et al. |
| 5,850,470 | A | 12/1998 | Kung et al. |
| 5,862,217 | A | 1/1999 | Steinberg et al. |
| 5,862,218 | A | 1/1999 | Steinberg |
| 5,892,837 | A | 4/1999 | Luo et al. |
| 5,949,904 | A | 9/1999 | Delp |
| 5,974,189 | A | 10/1999 | Nicponski |
| 5,990,973 | A | 11/1999 | Sakamoto |
| 5,991,456 | A | 11/1999 | Rahman et al. |
| 5,991,549 | A | 11/1999 | Tsuchida |
| 5,991,594 | A | 11/1999 | Froeber et al. |
| 5,999,160 | A | 12/1999 | Kitamura et al. |
| 6,006,039 | A | 12/1999 | Steinberg et al. |
| 6,009,209 | A | 12/1999 | Acker et al. |
| 6,011,547 | A | 1/2000 | Shiota et al. |
| 6,016,354 | A | 1/2000 | Lin et al. |
| 6,028,611 | A | 2/2000 | Anderson et al. |
| 6,035,072 | A | 3/2000 | Read |
| 6,035,074 | A | 3/2000 | Fujimoto et al. |
| 6,036,072 | A | 3/2000 | Lee |
| 6,101,271 | A | 8/2000 | Yamashita et al. |
| 6,104,839 | A | 8/2000 | Cok et al. |
| 6,118,485 | A | 9/2000 | Hinoue et al. |
| 6,134,339 | A | 10/2000 | Luo |
| 6,151,403 | A | 11/2000 | Luo |
| 6,172,706 | B1 | 1/2001 | Tatsumi |
| 6,192,149 | B1 | 2/2001 | Eschbach et al. |
| 6,195,127 | B1 | 2/2001 | Sugimoto |
| 6,201,571 | B1 | 3/2001 | Ota |
| 6,204,858 | B1 | 3/2001 | Gupta |
| 6,233,364 | B1 | 5/2001 | Krainiouk et al. |
| 6,249,315 | B1 | 6/2001 | Holm |
| 6,252,976 | B1 | 6/2001 | Schildkraut et al. |
| 6,266,054 | B1 | 7/2001 | Lawton et al. |
| 6,268,939 | B1 | 7/2001 | Klassen et al. |
| 6,275,614 | B1 | 8/2001 | Krishnamurthy et al. |
| 6,278,491 | B1 | 8/2001 | Wang et al. |
| 6,285,410 | B1 | 9/2001 | Marni |
| 6,292,574 | B1 | 9/2001 | Schildkraut et al. |
| 6,295,378 | B1 | 9/2001 | Kitakado et al. |
| 6,298,166 | B1 | 10/2001 | Ratnakar et al. |
| 6,300,935 | B1 | 10/2001 | Sobel et al. |
| 6,381,345 | B1 | 4/2002 | Swain |
| 6,393,148 | B1 | 5/2002 | Bhaskar |
| 6,396,963 | B2 | 5/2002 | Shaffer et al. |
| 6,407,777 | B1 | 6/2002 | DeLuca |
| 6,421,468 | B1 | 7/2002 | Ratnakar et al. |
| 6,426,775 | B1 | 7/2002 | Kurokawa |
| 6,429,924 | B1 | 8/2002 | Milch |
| 6,433,818 | B1 | 8/2002 | Steinberg et al. |
| 6,438,264 | B1 | 8/2002 | Gallagher et al. |
| 6,441,854 | B2 | 8/2002 | Fellegara et al. |
| 6,459,436 | B1 | 10/2002 | Kumada et al. |
| 6,473,199 | B1 | 10/2002 | Gilman et al. |
| 6,496,655 | B1 | 12/2002 | Malloy Desormeaux |
| 6,501,911 | B1 | 12/2002 | Malloy Desormeaux |
| 6,505,003 | B1 | 1/2003 | Malloy Desormeaux |
| 6,510,520 | B1 | 1/2003 | Steinberg |
| 6,516,154 | B1 | 2/2003 | Parulski et al. |
| 6,614,471 | B1 | 9/2003 | Ott |
| 6,614,995 | B2 | 9/2003 | Tseng |
| 6,621,867 | B1 | 9/2003 | Sazzad et al. |
| 6,628,833 | B1 | 9/2003 | Horie |
| 6,700,614 | B1 | 3/2004 | Hata |
| 6,707,950 | B1 | 3/2004 | Burns et al. |
| 6,714,665 | B1 | 3/2004 | Hanna et al. |
| 6,718,051 | B1 | 4/2004 | Eschbach |
| 6,724,941 | B1 | 4/2004 | Aoyama |
| 6,728,401 | B1 | 4/2004 | Hardeberg |
| 6,765,686 | B2 | 7/2004 | Maruoka |
| 6,786,655 | B2 | 9/2004 | Cook et al. |
| 6,792,161 | B1 | 9/2004 | Imaizumi et al. |
| 6,798,913 | B2 | 9/2004 | Toriyama |
| 6,859,565 | B2 | 2/2005 | Baron |
| 6,873,743 | B2 | 3/2005 | Steinberg |
| 6,885,766 | B2 | 4/2005 | Held et al. |
| 6,895,112 | B2 | 5/2005 | Chen et al. |
| 6,900,882 | B2 | 5/2005 | Iida |
| 6,912,298 | B1 | 6/2005 | Wilensky |
| 6,937,997 | B1 | 8/2005 | Parulski |
| 6,967,680 | B1 | 11/2005 | Kagle et al. |
| 6,980,691 | B2 | 12/2005 | Nesterov et al. |
| 6,984,039 | B2 | 1/2006 | Agostinelli |
| 7,024,051 | B2 | 4/2006 | Miller et al. |
| 7,027,662 | B2 | 4/2006 | Baron |
| 7,030,927 | B2 | 4/2006 | Sasaki |
| 7,035,461 | B2 | 4/2006 | Luo et al. |
| 7,035,462 | B2 | 4/2006 | White et al. |
| 7,042,501 | B1 | 5/2006 | Matama |
| 7,042,505 | B1 | 5/2006 | DeLuca |
| 7,062,086 | B2 | 6/2006 | Chen et al. |
| 7,116,820 | B2 | 10/2006 | Luo et al. |
| 7,133,070 | B2 | 11/2006 | Wheeler et al. |
| 7,155,058 | B2 | 12/2006 | Gaubatz et al. |
| 7,171,044 | B2 * | 1/2007 | Chen et al. .................. 382/165 |
| 7,216,289 | B2 | 5/2007 | Kagle et al. |
| 7,224,850 | B2 | 5/2007 | Zhang et al. |
| 7,269,292 | B2 | 9/2007 | Steinberg |
| 7,289,664 | B2 | 10/2007 | Enomoto |
| 7,295,233 | B2 | 11/2007 | Steinberg et al. |
| 7,310,443 | B1 | 12/2007 | Kris et al. |
| 7,315,631 | B1 | 1/2008 | Corcoran et al. |
| 7,336,821 | B2 * | 2/2008 | Ciuc et al. .................. 382/167 |
| 7,352,394 | B1 | 4/2008 | DeLuca et al. |
| 7,362,368 | B2 | 4/2008 | Steinberg et al. |
| 7,369,712 | B2 | 5/2008 | Steinberg et al. |
| 7,403,643 | B2 | 7/2008 | Ianculescu et al. |
| 7,436,998 | B2 | 10/2008 | Steinberg et al. |
| 7,454,040 | B2 | 11/2008 | Luo et al. |
| 7,515,740 | B2 | 4/2009 | Corcoran et al. |
| 2001/0015760 | A1 | 8/2001 | Fellegara et al. |
| 2001/0031142 | A1 | 10/2001 | Whiteside |
| 2001/0052937 | A1 | 12/2001 | Susuki |
| 2002/0019859 | A1 | 2/2002 | Watanabe |
| 2002/0041329 | A1 | 4/2002 | Steinberg |
| 2002/0051571 | A1 | 5/2002 | Jackway et al. |
| 2002/0054224 | A1 | 5/2002 | Wasula et al. |
| 2002/0085088 | A1 | 7/2002 | Eubanks |
| 2002/0090133 | A1 | 7/2002 | Kim et al. |
| 2002/0093577 | A1 | 7/2002 | Kitawaki et al. |
| 2002/0093633 | A1 | 7/2002 | Milch |
| 2002/0105662 | A1 | 8/2002 | Patton et al. |
| 2002/0114513 | A1 | 8/2002 | Hirao |
| 2002/0126893 | A1 | 9/2002 | Held et al. |
| 2002/0131770 | A1 | 9/2002 | Meier et al. |
| 2002/0136450 | A1 | 9/2002 | Chen et al. |

| | | |
|---|---|---|
| 2002/0141661 A1 | 10/2002 | Steinberg |
| 2002/0150292 A1 | 10/2002 | O'Callaghan |
| 2002/0150306 A1 | 10/2002 | Baron |
| 2002/0159630 A1 | 10/2002 | Buzuloiu et al. |
| 2002/0172419 A1 | 11/2002 | Lin et al. |
| 2002/0176623 A1* | 11/2002 | Steinberg ............ 382/165 |
| 2003/0007687 A1* | 1/2003 | Nesterov et al. ........ 382/167 |
| 2003/0021478 A1 | 1/2003 | Yoshida |
| 2003/0025808 A1 | 2/2003 | Parulski et al. |
| 2003/0025811 A1 | 2/2003 | Keelan et al. |
| 2003/0044063 A1 | 3/2003 | Meckes et al. |
| 2003/0044070 A1 | 3/2003 | Fuersich et al. |
| 2003/0044176 A1 | 3/2003 | Saitoh |
| 2003/0044177 A1 | 3/2003 | Oberhardt et al. |
| 2003/0044178 A1 | 3/2003 | Oberhardt et al. |
| 2003/0052991 A1 | 3/2003 | Stavely et al. |
| 2003/0058343 A1 | 3/2003 | Katayama |
| 2003/0058349 A1 | 3/2003 | Takemoto |
| 2003/0095197 A1 | 5/2003 | Wheeler et al. |
| 2003/0107649 A1 | 6/2003 | Flickner et al. |
| 2003/0113035 A1 | 6/2003 | Cahill et al. |
| 2003/0118216 A1 | 6/2003 | Goldberg |
| 2003/0137597 A1 | 7/2003 | Sakamoto et al. |
| 2003/0142285 A1 | 7/2003 | Enomoto |
| 2003/0161506 A1 | 8/2003 | Velazquez et al. |
| 2003/0190072 A1 | 10/2003 | Adkins et al. |
| 2003/0194143 A1 | 10/2003 | Iida |
| 2003/0202715 A1 | 10/2003 | Kinjo |
| 2004/0017481 A1 | 1/2004 | Takasumi et al. |
| 2004/0027593 A1 | 2/2004 | Wilkins |
| 2004/0032512 A1 | 2/2004 | Silverbrook |
| 2004/0032526 A1 | 2/2004 | Silverbrook |
| 2004/0033071 A1 | 2/2004 | Kubo |
| 2004/0037460 A1 | 2/2004 | Luo et al. |
| 2004/0041924 A1 | 3/2004 | White et al. |
| 2004/0046878 A1 | 3/2004 | Jarman |
| 2004/0047491 A1 | 3/2004 | Rydeck |
| 2004/0056975 A1 | 3/2004 | Hata |
| 2004/0057623 A1 | 3/2004 | Schuhrke et al. |
| 2004/0057705 A1 | 3/2004 | Kohno |
| 2004/0057715 A1 | 3/2004 | Tsuchida et al. |
| 2004/0090461 A1 | 5/2004 | Adams |
| 2004/0093432 A1 | 5/2004 | Luo et al. |
| 2004/0114796 A1 | 6/2004 | Kaku |
| 2004/0114797 A1 | 6/2004 | Meckes |
| 2004/0114829 A1 | 6/2004 | LeFeuvre et al. |
| 2004/0114904 A1 | 6/2004 | Sun et al. |
| 2004/0119851 A1 | 6/2004 | Kaku |
| 2004/0120598 A1 | 6/2004 | Feng |
| 2004/0125387 A1 | 7/2004 | Nagao et al. |
| 2004/0126086 A1 | 7/2004 | Nakamura et al. |
| 2004/0141657 A1 | 7/2004 | Jarman |
| 2004/0150743 A1 | 8/2004 | Schinner |
| 2004/0160517 A1 | 8/2004 | Iida |
| 2004/0165215 A1 | 8/2004 | Raguet et al. |
| 2004/0184044 A1 | 9/2004 | Kolb et al. |
| 2004/0184670 A1 | 9/2004 | Jarman et al. |
| 2004/0196292 A1 | 10/2004 | Okamura |
| 2004/0196503 A1 | 10/2004 | Kurtenbach et al. |
| 2004/0213476 A1 | 10/2004 | Luo et al. |
| 2004/0223063 A1 | 11/2004 | DeLuca et al. |
| 2004/0227978 A1 | 11/2004 | Enomoto |
| 2004/0228542 A1 | 11/2004 | Zhang et al. |
| 2004/0233299 A1 | 11/2004 | Ioffe et al. |
| 2004/0233301 A1 | 11/2004 | Nakata et al. |
| 2004/0234156 A1 | 11/2004 | Watanabe et al. |
| 2004/0239779 A1 | 12/2004 | Washisu |
| 2004/0240747 A1* | 12/2004 | Jarman et al. ............ 382/274 |
| 2004/0258308 A1 | 12/2004 | Sadovsky et al. |
| 2005/0001024 A1 | 1/2005 | Kusaka et al. |
| 2005/0013602 A1 | 1/2005 | Ogawa |
| 2005/0013603 A1 | 1/2005 | Ichimasa |
| 2005/0024498 A1 | 2/2005 | Iida et al. |
| 2005/0031224 A1 | 2/2005 | Prilutsky et al. |
| 2005/0041121 A1* | 2/2005 | Steinberg et al. ........ 348/239 |
| 2005/0046730 A1 | 3/2005 | Li |
| 2005/0047655 A1 | 3/2005 | Luo et al. |
| 2005/0047656 A1 | 3/2005 | Luo et al. |
| 2005/0053279 A1 | 3/2005 | Chen et al. |
| 2005/0058340 A1 | 3/2005 | Chen et al. |
| 2005/0058342 A1 | 3/2005 | Chen et al. |
| 2005/0062856 A1 | 3/2005 | Matsushita |
| 2005/0063083 A1 | 3/2005 | Dart et al. |
| 2005/0068452 A1 | 3/2005 | Steinberg et al. |
| 2005/0074164 A1 | 4/2005 | Yonaha |
| 2005/0074179 A1 | 4/2005 | Wilensky |
| 2005/0078191 A1 | 4/2005 | Battles |
| 2005/0117132 A1 | 6/2005 | Agostinelli |
| 2005/0129331 A1 | 6/2005 | Kakiuchi et al. |
| 2005/0134719 A1 | 6/2005 | Beck |
| 2005/0140801 A1 | 6/2005 | Prilutsky et al. |
| 2005/0147278 A1 | 7/2005 | Rui et al. |
| 2005/0151943 A1 | 7/2005 | Iida |
| 2005/0163498 A1 | 7/2005 | Battles et al. |
| 2005/0168965 A1 | 8/2005 | Yoshida |
| 2005/0196067 A1 | 9/2005 | Gallagher et al. |
| 2005/0200736 A1 | 9/2005 | Ito |
| 2005/0207649 A1 | 9/2005 | Enomoto et al. |
| 2005/0212955 A1 | 9/2005 | Craig et al. |
| 2005/0219385 A1 | 10/2005 | Terakawa |
| 2005/0219608 A1 | 10/2005 | Wada |
| 2005/0220346 A1 | 10/2005 | Akahori |
| 2005/0220347 A1 | 10/2005 | Enomoto et al. |
| 2005/0226499 A1 | 10/2005 | Terakawa |
| 2005/0232490 A1 | 10/2005 | Itagaki et al. |
| 2005/0238230 A1* | 10/2005 | Yoshida ................ 382/167 |
| 2005/0243348 A1 | 11/2005 | Yonaha |
| 2005/0275734 A1 | 12/2005 | Ikeda |
| 2005/0276481 A1 | 12/2005 | Enomoto |
| 2005/0280717 A1 | 12/2005 | Sugimoto |
| 2005/0286766 A1 | 12/2005 | Ferman |
| 2006/0008171 A1 | 1/2006 | Petschnigg et al. |
| 2006/0017825 A1 | 1/2006 | Thakur |
| 2006/0038916 A1 | 2/2006 | Knoedgen et al. |
| 2006/0039690 A1 | 2/2006 | Steinberg et al. |
| 2006/0045352 A1 | 3/2006 | Gallagher |
| 2006/0050300 A1 | 3/2006 | Mitani et al. |
| 2006/0066628 A1 | 3/2006 | Brodie et al. |
| 2006/0082847 A1 | 4/2006 | Sugimoto |
| 2006/0093212 A1 | 5/2006 | Steinberg et al. |
| 2006/0093213 A1 | 5/2006 | Steinberg et al. |
| 2006/0093238 A1 | 5/2006 | Steinberg et al. |
| 2006/0098867 A1 | 5/2006 | Gallagher |
| 2006/0098875 A1 | 5/2006 | Sugimoto |
| 2006/0119832 A1 | 6/2006 | Iida |
| 2006/0120599 A1 | 6/2006 | Steinberg et al. |
| 2006/0140455 A1 | 6/2006 | Costache et al. |
| 2006/0150089 A1 | 7/2006 | Jensen et al. |
| 2006/0203108 A1 | 9/2006 | Steinberg et al. |
| 2006/0204052 A1 | 9/2006 | Yokouchi |
| 2006/0204110 A1 | 9/2006 | Steinberg et al. |
| 2006/0221408 A1 | 10/2006 | Fukuda |
| 2006/0285754 A1 | 12/2006 | Steinberg et al. |
| 2007/0110305 A1 | 5/2007 | Corcoran et al. |
| 2007/0116379 A1 | 5/2007 | Corcoran et al. |
| 2007/0116380 A1 | 5/2007 | Ciuc et al. |
| 2007/0133863 A1 | 6/2007 | Sakai et al. |
| 2007/0154189 A1 | 7/2007 | Harradine et al. |
| 2007/0201724 A1 | 8/2007 | Steinberg et al. |
| 2007/0263104 A1 | 11/2007 | DeLuca et al. |
| 2007/0263928 A1 | 11/2007 | Akahori |
| 2008/0002060 A1 | 1/2008 | DeLuca et al. |
| 2008/0013798 A1 | 1/2008 | Ionita et al. |
| 2008/0043121 A1 | 2/2008 | Prilutsky et al. |
| 2008/0112599 A1 | 5/2008 | Nanu et al. |
| 2008/0144965 A1 | 6/2008 | Steinberg et al. |
| 2008/0186389 A1 | 8/2008 | DeLuca et al. |
| 2008/0211937 A1 | 9/2008 | Steinberg et al. |
| 2008/0232711 A1 | 9/2008 | Prilutsky et al. |
| 2008/0240555 A1 | 10/2008 | Nanu et al. |

FOREIGN PATENT DOCUMENTS

| | | |
|---|---|---|
| EP | 0979487 | 1/1998 |
| EP | 884694 A1 | 12/1998 |
| EP | 911759 A2 | 4/1999 |
| EP | 911759 A3 | 4/1999 |
| EP | 1199672 A2 | 4/2002 |
| EP | 1229486 A1 | 8/2002 |

| | | | |
|---|---|---|---|
| EP | 1288858 A1 | 3/2003 |
| EP | 1288859 A1 | 3/2003 |
| EP | 1288860 A1 | 3/2003 |
| EP | 1293933 A1 | 3/2003 |
| EP | 1296510 A2 | 3/2003 |
| EP | 1429290 A2 | 6/2004 |
| EP | 1478169 A2 | 11/2004 |
| EP | 1528509 A2 | 5/2005 |
| EP | 1429290 B1 | 7/2008 |
| GB | 841609 A | 7/1960 |
| JP | 3205989 A2 | 9/1991 |
| JP | 4192681 A2 | 7/1992 |
| JP | 7-281285 A2 | 10/1995 |
| JP | 09-214839 | 8/1997 |
| JP | 20134486 A2 | 5/2000 |
| JP | 22247596 A2 | 8/2002 |
| JP | 22271808 A2 | 9/2002 |
| JP | 2003-030647 A2 | 1/2003 |
| WO | 98/02844 | 1/1998 |
| WO | WO-9917251 A1 | 4/1999 |
| WO | 99/33684 A2 | 7/1999 |
| WO | WO-0171421 A1 | 9/2001 |
| WO | WO 01/92614 A1 | 12/2001 |
| WO | WO-0245063 A1 | 6/2002 |
| WO | WO-03026278 A1 | 3/2003 |
| WO | WO-03071484 A1 | 8/2003 |
| WO | 2004/034696 A1 | 4/2004 |
| WO | WO-2005015896 A1 | 2/2005 |
| WO | WO-20050141558 A1 | 5/2005 |
| WO | WO-2005076217 A2 | 8/2005 |
| WO | WO-2005076217 A3 | 8/2005 |
| WO | WO 2005/087994 A1 | 9/2005 |
| WO | WO-2005109853 A1 | 11/2005 |
| WO | WO-2006011635 A1 | 2/2006 |
| WO | WO-2006018056 A1 | 2/2006 |
| WO | WO-2006045441 A1 | 5/2006 |
| WO | WO-2007057063 A1 | 5/2007 |
| WO | WO-2007057064 A1 | 5/2007 |
| WO | 2007/095553 A2 | 8/2007 |
| WO | WO-2007093199 A2 | 8/2007 |
| WO | WO-2007093199 A3 | 8/2007 |
| WO | WO-2007142621 A1 | 12/2007 |
| WO | WO-2008023280 A2 | 2/2008 |
| WO | 2007/095553 A3 | 8/2008 |
| WO | WO-2008109644 A2 | 9/2008 |
| WO | WO-2008109644 A3 | 9/2008 |
| WO | WO 2010/017953 A1 | 2/2010 |
| WO | WO 2010/025908 A1 | 3/2010 |

OTHER PUBLICATIONS

PCT Notification Concerning Transmittal of International Preliminary Report on Patentability, for PCT Application No. PCT/US2007/062090, dated Aug. 28, 2008, 6 pages.
Agrawal A. et al., "Removing photography artifacts using gradient projection and flash-exposure sampling" ACM Transactions on Graphics, 2005, pp. 828-835.
Final Office Action mailed Mar. 24, 2010, for U.S. Appl. No. 11/462,035, filed Aug. 2, 2006.
Final Office Action mailed Nov. 20, 2009, for U.S. Appl. No. 12/192,897, filed Aug. 15, 2008.
Non-Final Office Action mailed Aug. 31, 2009, for U.S. Appl. No. 11/462,035, filed Aug. 2, 2006.
Non-Final Office Action mailed Jul. 14, 2009, for U.S. Appl. No. 12/192,897, filed Aug. 15, 2008.
Non-Final Office Action mailed Oct. 5, 2009, for U.S. Appl. No. 10/919,226, filed Aug. 16, 2004.
Non-Final Office Action mailed Oct. 7, 2009, for U.S. Appl. No. 12/119,614, filed May 13, 2008.
Non-Final Office Action mailed Oct. 29, 2009, for U.S. Appl. No. 12/194,148, filed Aug. 19, 2008.
Notice of Allowance mailed Feb. 1, 2010, for U.S. Appl. No. 10/919,226, filed Aug. 16, 2004.
Notice of Allowance mailed Feb. 19, 2010, for U.S. Appl. No. 12/119,614, filed May 13, 2008.
Notice of Allowance mailed Feb. 19, 2010, for U.S. Appl. No. 12/194,148, filed Aug. 19, 2008.
Notice of Allowance mailed Nov. 18, 2009, for U.S. Appl. No. 11/282,954, filed Nov. 18, 2005.
PCT Notification of Transmittal of the International Search Report and the Written Opinion of the International Searching Authority, or the Declaration, for PCT Application No. PCT/EP2009/005809, dated Nov. 24, 2009, 12 pages.
PCT Notification of Transmittal of the International Search Report and the Written Opinion of the International Searching Authority, or the Declaration, for PCT Application No. PCT/EP2009/006361, dated Nov. 24, 2009, 10 pages.
PCT Partial International Search Report for Application No. PCT/EP2009/051081, dated Apr. 29, 2009, 7 pages.
Tatsutoshi Kitajima (JP04-192681 English Translation; Electronic Camera, Jul. 10, 1992).
Translation of Hiroshi et al. JP05-224271, Mar. 1993, Japan Publication.
Combier, Nathalie; Dauty, Isabelle; Lemoine, Jacques, "Removal of Defects on Flash Radiographic Images by Fuzzy Combination", Conference: Machine Vision Applications in Industrial Inspection III, San Jose, CA, USA, (Sponsor: SPIE International Society for Opt Engineering, Bellingham, WA USA), Proceedings of SPIE—The International Society for Optical Engineering v 2423 1995. Society of Photo-Optical Instrumentation, Bellingham, WA, USA. p. 301-312, 1995, http://rlinks2.dialog.com/NASApp/ChannelWEB/DialogProServlet?ChName=engineerin.
Cucchiara, R. Piccardi, M., "Detection of Luminosity Profiles of Elongated Shapes", Ferrara Univ., Italy; International Conference on Image Processing, 1996.Proceedings, Publication Date: Sep. 16-19, 1996, vol. 3, pp. 635-638 vol. 3, DOI: 10.1109/ICIP.1996.560575 Posted online: Aug. 6, 2002 20:44:17.0 http://ieeexplore.ieee.org/search/freesrchabstract.jsp?arnumber=560575&isnumber=12210&punumber=4140&k2dockey=560575@ieeecnfs&query=%28%28images+and+defects+and+luminance%29%29+%3Cin%3E+metadata&pos=2.
Han, T., Goodenough, D.G., Dyk, A., Love, J., "Detection and Correction of abnormal Pixels in Hyperion Images", 2002 IEEE International Symposium on Geoscience and Remote Sensing, Jun. 24-28, 2002, vol. 3, pp. 1327-1330 vol. 3, DOI: 10.1109/ IGARSS.2002.1026105, Posted online: 2002-11-0717:05:47.0 correction, atmospheric correction, and further analysis. http://ieeexplore.ieee.org/search/freesrchabstract.jsp?arnumber=1026105&isnumber=22038&punumber=7969&k2dockey=1026105@ieeecnfs&query=%28images+and.
Iivarinen, J., and J Pakkanen, "Content-Based Retrieval of Defect Images", Proceedings of Advanced Concepts for Intelligent Vision, Laboratory of Computer Information Science. http://www.cs.tut.fi/~avisa/digger/Publications/acivs02.pdf.
Ito, M., "An Automated System for LSI Fine Pattern Inspection Based on Comparison of Sem Images and Cad Data", IEEE International Conference on Robotics and Automation, 1995. Proceedings, Publication Date: May 21-27, 1995, vol. 1,pp. 544-549 vol. 1, DOI: 10.1109/ROBOT.1995.525340, Posted online:Aug. 6, 2002 20:08:01.0 http://ieeexplore.ieee.org/search/freesrchabstract.jsp?arnumber=525340&isnumber=11429&punumber=3951&k2dockey=525340 @ieeecnfs&query=%28%28%28%28images+and+defects+and+correction%29%29%29%29+%3Clin%3E.
Plotnikov, Yuri, and William P. Winfree, "Advanced Image Processing for Defect Visualization in Infrared Thermography" (1998), NASA Langley Research Center, M.S. Posted: ACM Portal, http://citeseer.ist.psu.edu/plotnikov98advanced.html.
Jin, B., Park, N. George, K.M., Yeary, M.B., "Modeling and Analysis of Soft-Test/Repair for CCD-Based Digital X-Ray Systems", Instrumentation and Measurement, IEEE Transactions on, Dec. 2003, vol. 52, Issue: 6, pp. 17131721, ISSN: 0018-9456, Digital Object Identifier: 10.1109/TIM.2003.818735, Posted online: Nov. 24, 2003 09:36:26.0 http://ieeexplore.ieee.org/search/freesrchabstract.jsp?arnumber=1246541&isnumber=27936&punumber=19&k2dockey=1246541@ieeejrns&query=%28%28images+and.
Plotnikov, Yuri and William P. Winfree, "Visualization of Subsurface Defects in Composites Using a Focal Plane Array Infrared Camera" (1999), NASA Langley Research Center, http://citeseer.ist.psu.edu/357066.html.

Toet, A., "Multiscale Color Image Enhancement", International Conference on Image Processing and its Applications, 1992., Publication Date: Apr. 7-9, 1992,pp. 583-585, Meeting Date: Apr. 7, 1992-Apr. 9, 1992Posted online: 200208-06 18:09:24.0 http://ieeexplore.ieee.org/search/freesrchabstract.jsp?arnumber=146865&isnumber=3917&punumber=1197&k2dockey=146865@ieecnfs&query=%28%28images+and+defects+and+luminance%29%29+%3Cin%3E+metadata&pos=1.

Yap-Peng, Tan Acharya, T.A, "Robust Sequential Approach for the Detection of Defective Pixels in an Image Sensor", 1999, IEEE International Conference on Acoustics, Speech, and Signal Processing, 1999. ICASSP '99. Proceedings, Mar. 15-19, 1999, vol. 4, pp. 2239-2242, DOI: 10.1109/ICASSP.1999.758382, http://ieeexploreieee.org/search/freesrchabstract.jsp?arnumber=758382&isnumber=16342&punumber=6110&k2dockey=758382@ieeecnfs&query=%28%28%28%28images+and+defects+and+correction%29%29%29%29+%3Cin%3E.

Notification of Transmittal of the International Search Report and the Written Opinion of the International Searching Authority, or the Declaration for PCT Application No. PCT/US07/62090 issued Mar. 10, 2008, 10 pages.

Corcoran, P. et al., "Automated In-Camera Detection of Flash-Eye Defects", IEEE Transactions on Consumer Electronics, 2005, pp. 11-17, vol. 51—Issue 1.

EPO Communication pursuant to Article 94(3) EPC. for European Patent Application No. 05 792 584.4, paper dated May 13, 2008, 8 pages.

European Patent Office, Communication pursuant to Article 94(3) EPC Application No. 04763763.2, dated Mar. 7, 2008, 7 pages.

European Patent Office. Communication pursuant to Article 96(2) EPC for Application No. 04763763.2, dated Aug. 29, 2006, 4 pages.

Examination Report for European patent application No. 05792584.4, dated May 13, 2008, 8 pgs.

Gaubatz, Matthew et al., "Automatic Red-Eye Detection and Correction", IEEE ICIP Proceedings 2002 Intl Conference on Image Processing, 2002, pp. 1-804 1-807, vol. 2—Issue 3.

Ioffe, S., "Red eye detection with machine learning", Proceedings 2003 International Conference on Image Processing, 2003, pp. 871-874, vol. 2—Issue 3.

Nguyen, Karlene et al., "Differences in the Infrared Bright Pupil Response of Human Eyes", Proceedings of the 2002 symposium on Eye tracking research and applications, 2002, pp. 133-138.

Patent Abstracts of Japan, publication No. 2000050062, Image Input Device, application No. 10-217124, published Feb. 18, 2000, 1 page.

PCT International Preliminary Report on Patentability (IPRP) for PCT Application PCT/EP2005/011010, dated Jan. 23, 2007, 18 pages.

PCT International Preliminary Report on Patentability for PCT Application No. PCT/EP2005/005907, dated Nov. 15, 2006, 8 pages.

PCT International Preliminary Report on Patentability for PCT Application PCT/EP2004/008706, dated Feb. 6, 2006, 7 pages.

PCT International Preliminary Report on Patentability for PCT Application PCT/EP2004/010199, dated Apr. 3, 2006, 7 pages.

PCT International Search Report and the Written Opinion of the International Searching Authority or the Declaration for PCT Application No. PCT/US2008/055864, dated Jul. 30, 2008, 8 pages.

PCT International Search Report and Written Opinion of the International Searching Authority for PCT Application No. PCT/EP2004/008706, dated Nov. 19, 2004, 13 pages.

PCT International Search Report and Written Opinion of the International Searching Authority for PCT Application No. PCT/EP2005/005033.

PCT Notification of Transmittal of the International Search Report and the Written Opinion of the Intl Searching Authority, or the Declaration (PCT/EP2006/008342), dated Dec. 28, 2006.

PCT Notification of Transmittal of the International Search Report and the Written Opinion of the Intl Searching Authority, or the Declaration for PCT/EP/2005/011010, Jan. 23, 2006, 14 pages.

PCT Notification of Transmittal of the International Search Report and the Written Opinion of the Intl Searching Authority, or the Declaration for PCT/EP/2005/05907, Aug. 1, 2005, 12 pages.

PCT Notification of Transmittal of the International Search Report and the Written Opinion of the Intl Searching Authority, or the Declaration, for PCT Application No. PCT/EP2006/008358, Dec. 5, 2006, 14 pages.

PCT Notification of Transmittal of the International Search Report and the Written Opinion of the International Searching Authority, or the Declaration, for PCT Application No. PCT/US2008/055964, paper dated Jul. 30, 2008, 8 Pages.

PCT Notification of Transmittal of the International Search Report and the Written Opinion of the International Searching Authority, or the Declaration , for PCT/EP2004/010199, paper dated Dec. 13, 2004, 13 pages.

PCT Notification of Transmittal of the International Search Report and Written Opinion of the International Searching Authority for PCT Application No. PCT/EP2005/001171, (11 pages).

Sahba, F. et al., "Filter Fusion for Image Enhancement Using Reinforcement Learning, XP010654204, ISBN: 0-7803-7781-8", Canadian Conference on Electrical and computer Engineering, 2003, pp. 847-850, vol. 3.

Shen, Jianhong, "Impainting and the Fundamental Problem of Image Processing", 2002, 6 pages.

Smolka, B. et al., "Towards Automatic Redeye Effect Removal, XP004416063", Pattern Recognition Letters, 2003, pp. 1767-1785, vol. 24—Issue 11, North Holland Publ.

U.S. Appl. No. 10/772,767, filed Feb. 4, 2004, by inv Michael J. DeLuca, et al.

U.S. Appl. No. 10/170,511, filed Jun. 12, 2002, inventor Michael J. DeLuca.

U.S. Appl. No. 11/217,788, filed Aug. 30, 2005, inventors Eran Steinberg, et al.

Willamowski, J. et al., "Probablistic Automatic Red Eye Detection and Correction", The 18th International Conference on Pattern Recognition (ICPR'06), 2006, pp. 762-765, vol. 3, IEEE Computer Society.

United Kingdom Search Report dated May 22, 2007, issued in Application No. GB 0701957.3.

* cited by examiner

AUTOMATIC DETECTION AND CORRECTION OF NON-RED EYE FLASH DEFECTS

PRIORITY

This application is a Continuation of U.S. patent application Ser. No. 11/674,633, filed Feb. 13, 2007, now U.S. Pat. No. 7,336,821, which claims the benefit of priority under 35 USC §119 to U.S. provisional patent application No. 60/773,714, filed Feb. 14, 2006.

BACKGROUND

1. Field of the Invention

The present invention relates to a system and method for automatically detecting and correcting non red-eye flash defects in an image, and in particular, white-eye flash defects.

2. Description of the Related Art

Published PCT patent application No. WO 03/071484 A1 to Pixology, discloses a variety of techniques for red-eye detection and correction in digital images. In particular, Pixology discloses detecting "glint" of a red-eye defect and then analyzing the surrounding region to determine the full extent of the eye defect.

U.S. Pat. No. 6,873,743 to Steinberg discloses a similar technique where initial image segmentation is based on both a red chrominance component and a luminance component.

White-eye defects (white eyes) do not present the red hue of the more common red eye defects. White eye occurs more rarely but under the same conditions as red eye, i.e. pictures taken with a flash in poor illumination conditions. In some cases, white eyes appear slightly golden by acquiring a yellowish hue.

There are two main types of white-eye, small and large. Small white eyes, as illustrated at reference 10 in FIG. 1, appear on far distant subjects. They resemble luminous dots and information in their neighborhood about other facial features is poor and therefore unreliable. Large white eyes 20 as illustrated in FIG. 2, are very well defined and one can rely on information around them. In general, a white eye is large if it occupies a region including more than 150 pixels (for a 1600× 200 pixel image).

It is desired to have a technique for detecting and/or correcting white eye defects.

SUMMARY OF THE INVENTION

A method is provided for detecting non-red eye flash defects in an image. One or more luminous regions are defined in said image. Each region has at least one pixel having luminance above a luminance threshold value and a redness below a red threshold value. At least one filter is applied to a region corresponding to each luminous region. The roundness of a region corresponding to each luminous region is calculated. In accordance with the filtering and the roundness, it is determined whether the region corresponds to a non-red eye flash defect.

The defining may include selecting pixels of the image which have a luminance above a luminance threshold value and a redness below a red threshold value, and grouping neighboring selected pixels into the one or more luminous regions.

The method may further include correcting the non-red eye flash defect. One or more pixels of a detected defect region may be darkened. It may be determined not to darken pixels within a detected defect region having an intensity value greater than a threshold. The correcting, for each pixel of a detected defect region, may include setting its intensity value to an intensity value substantially equal to an average of the intensity values of pixels on a boundary of the defect region. An averaging filter may be applied to the region after the correcting.

The at least one filter may include any of a size filter for determining if said region is greater than a size expected for said non-red flash defect, a filter for adding pixels to a luminous region located with the luminous region and which have luminance below the luminance threshold value or a redness above the red threshold value, a skin filter for determining if the region is located within a region of an image characteristic of skin, or a face filter for determining if the region is located within a region of an image characteristic of a face, or any combination thereof.

The roundness calculation may be performed by a filter to determine if the region is a non-red eye flash defect.

For each luminous region, a corresponding aggregated region may be determined by determining a seed pixel for the aggregated region within a luminous region, and iteratively adding non-valley neighbouring pixels to the aggregated region until no non-valley neighboring pixels adjacent to the aggregated region remain. The region corresponding to each luminous region may be the aggregated region corresponding to the luminous region. Contrast may be calculated for an aggregated region by computing a ratio of the average intensity values of pixels on a boundary of said aggregated region to the intensity value of the seed pixel. It may be determined whether each aggregated region has a yellowness above a yellow threshold value. An average saturation may be calculated for each aggregated region and it may be determined whether the saturation exceeds a threshold value.

The at least one filter may be applied to the luminous region. An intensity gradient may be calculated for each luminous region. A Hough transform may be performed on each intensity gradient. A most representative circle on each transformed region may be determined, and each circle verified.

A digital image processing device is also provided that is operable to detect non-red eye flash defects in an image, and which includes a controller that is arranged to define one or more luminous regions in the image. Each region has at least one pixel with a luminance above a luminance threshold value and a redness below a red threshold value. At least one filter is applied to a region corresponding to each luminous region. The roundness of a region corresponding to each luminous region is calculated. In accordance with the filtering and the roundness, it is determined whether the region corresponds to a non-red eye flash defect.

The device may be a digital camera or camera phone, a general purpose, portable or hand-held computer, a printer or a digital scanner, or any combination thereof.

A further method is provided for correcting a white eye defect in a digital image. The method includes acquiring a digital image, and determining a luminance of pixels within the digital image. Those pixels having a luminance above a certain threshold are selected as candidate regions for correction of a white eye defect. The selected pixels are filtered, and white eye defect is corrected for non-filtered pixels among the candidate regions.

The filtering may include geometrical filtering of pixels based on a size or shape or both of a selected pixel region. A selected pixel region may be above a threshold size, for example. Skin tone or human face filtering of pixels may be based on neighboring pixels to a selected pixel region not having a skin tone or other human face characteristic.

Roundness may be calculated for a selected pixel region, which may be corrected if the roundness does not exceed a certain threshold value of roundness.

The correcting may include calculating a contrast of a selected pixel region, which may be corrected if it does not exceed a certain threshold value of contrast.

The filtering may include checking whether an average saturation of a selected pixel region exceeds a certain threshold saturation, and correcting the selected pixel region only if the threshold is exceeded.

A bright pixel may be selected as a seed pixel. A candidate region may be determined by aggregating outwardly from the seed pixel to combine those pixels that are not valley points with the seed pixel as an aggregated region until a minimum number of non-valley neighbors are left or a threshold size is reached, or a combination thereof. The minimum number may be zero. Intensities of points in the aggregated region may be set to an average intensity of valley points delimiting the region. The aggregated region may be smoothed.

The filtering may include determining and analyzing edges of candidate regions. An intensity gradient may be computed for one or more candidate regions. The one or more candidate regions having intensity gradient computed may be limited to include only candidate regions having a minimum size. A Hough transformation may be performed on the intensity gradient image corresponding to each candidate region. Candidate circles produced by the Hough transformation may be determined, and the candidate region may be filtered and not corrected when the seed pixel is not included in the candidate circle or the average gradient along the circle is below a threshold, or both.

A candidate region that is merely a glint may be filtered.

The method may also include detecting and correcting a red eye defect within the digital image.

One or more digital storage devices are also provided having executable program code embodied therein for programming one or more processors to perform a method as described herein.

BRIEF DESCRIPTION OF THE DRAWINGS

Statement Regarding Color Drawings

This patent application file contains at least one drawing executed in color. Copies of this patent or patent application publication with color drawing(s) will be provided by the Office upon request and payment of the necessary fee.

Figure 1A:
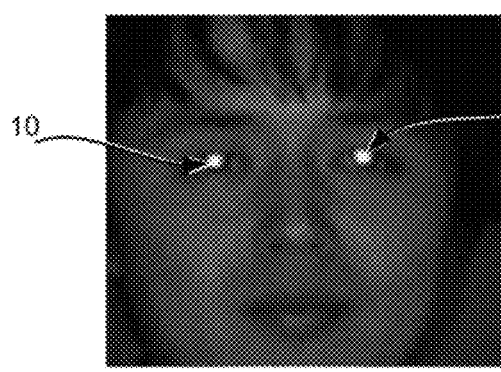
Figure 1B:
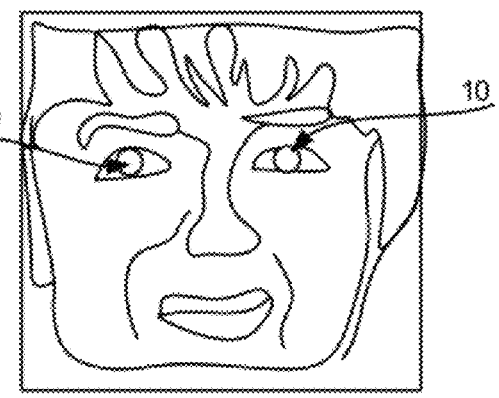
Figure 2A:
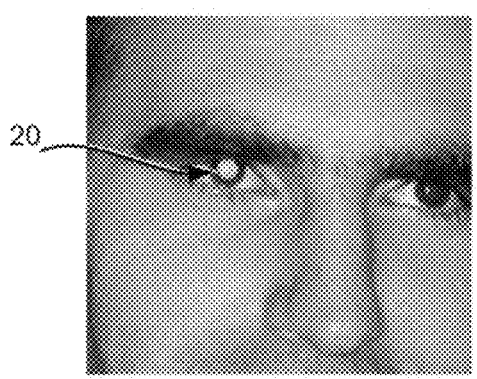
Figure 2B:
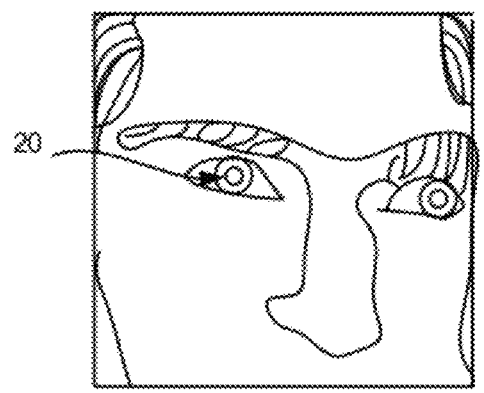
Figure 3:
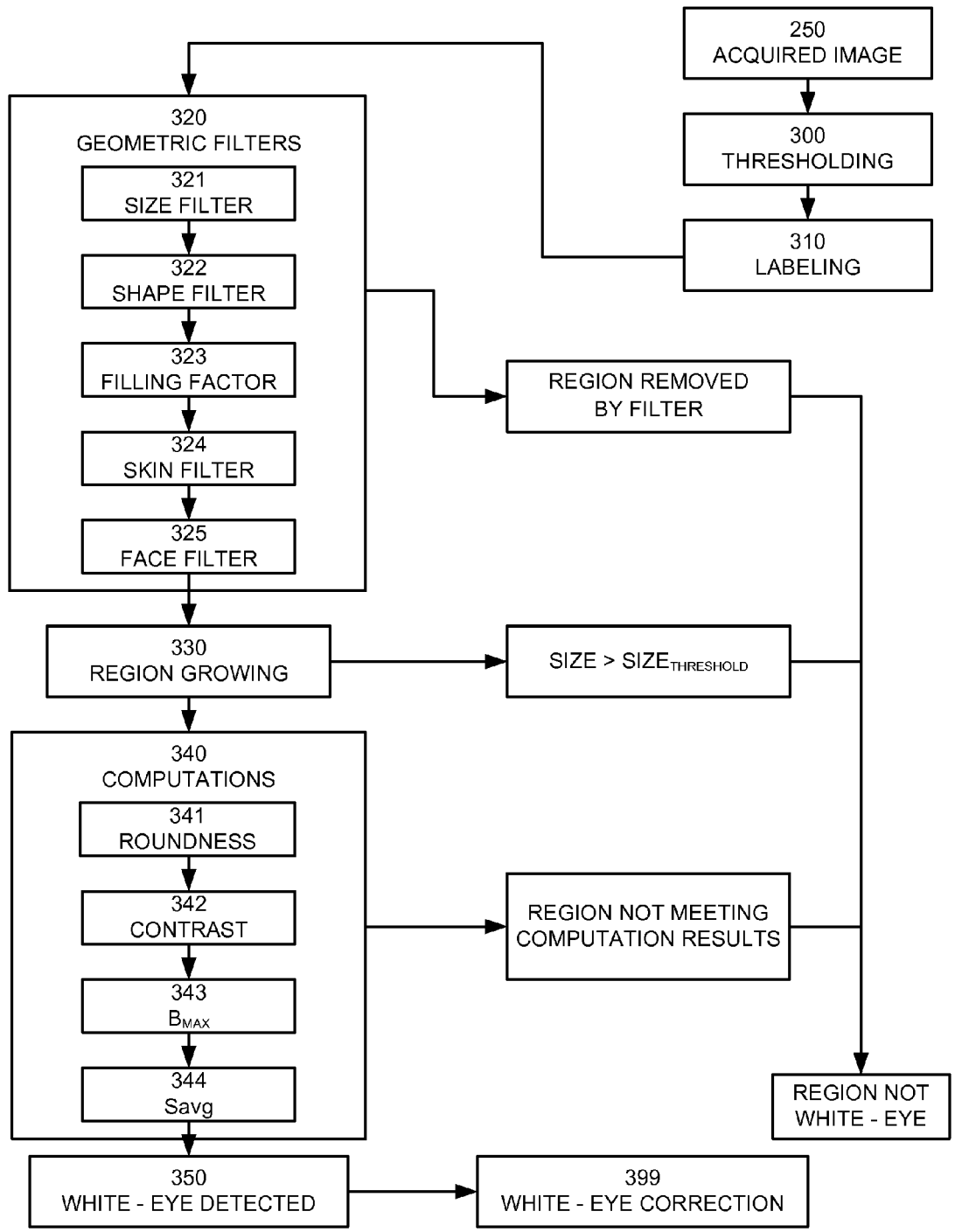
Figure 4:
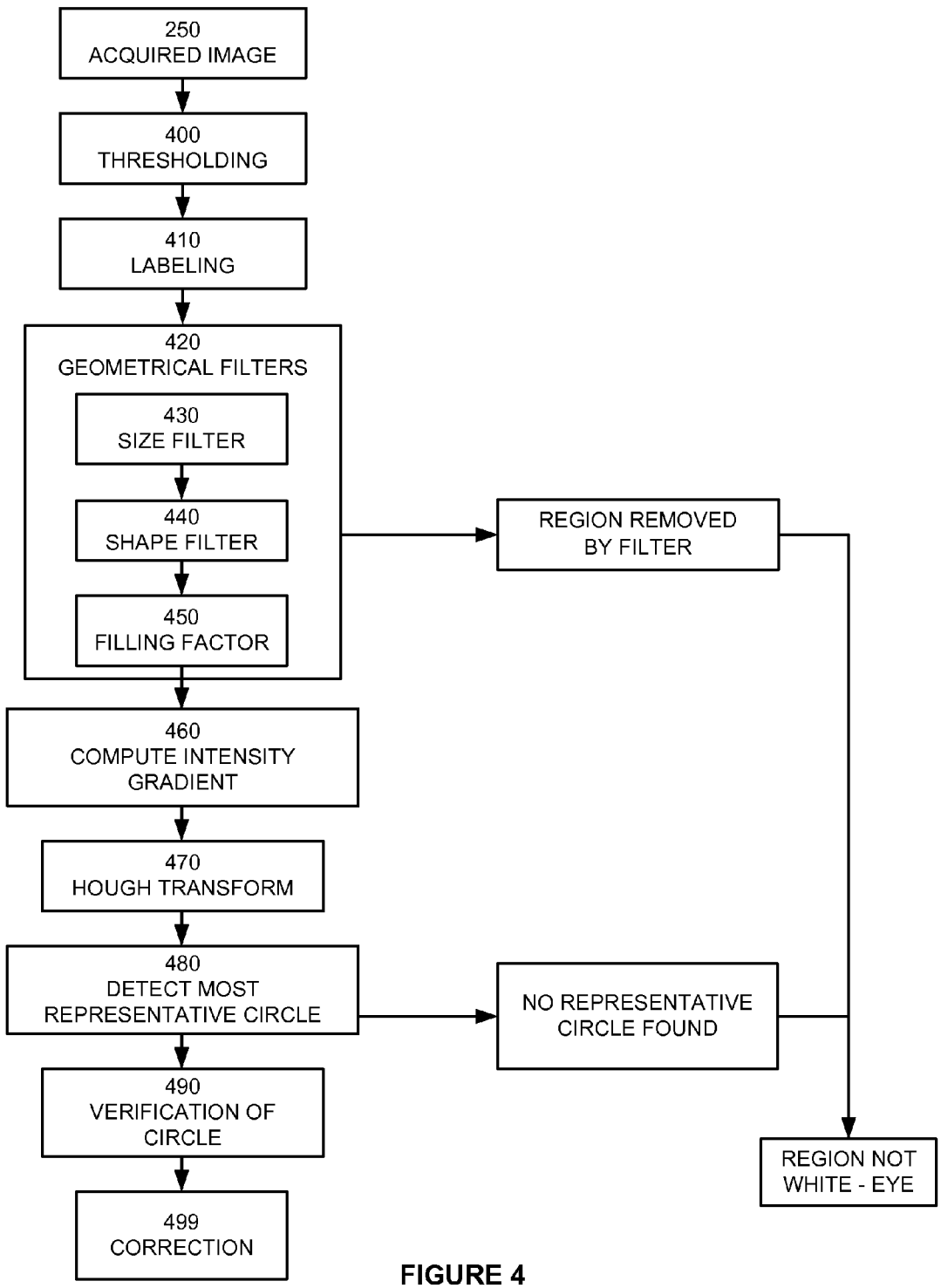
Figure 5A:
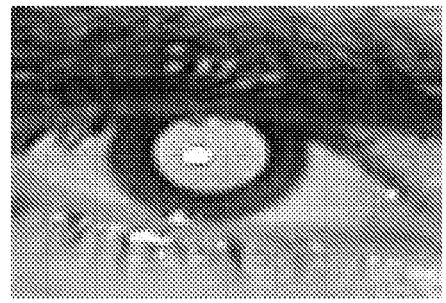
Figure 5B:
Figure 5C:
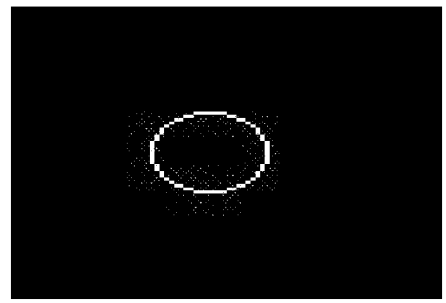

Embodiments will now be described, by way of example, with reference to the accompanying drawings, in which:

FIGS. 1(a) and (1b) (hereinafter "FIG. 1") illustrate an image with small white-eye defects;

FIGS. 2(a) and (2b) (hereinafter "FIG. 2") illustrate an image with a large white-eye defect;

FIG. 3 depicts a flow diagram of the automatic detection and correction of small white-eye defects;

FIG. 4 depicts a flow diagram of the automatic detection and correction of large white-eye defects;

FIG. 5(a) illustrates a grey-level version of an image to be corrected;

FIG. 5(b) illustrates an edge-image of the image of FIG. 5(a) carried out using a Sobel gradient; and FIG. 5(c) illustrates a most representative circle of the image of FIG. 5(b) as produced using the Hough Transform.

DETAILED DESCRIPTION OF THE EMBODIMENTS

A method is provided for automatic detection and correction of small white eyes. A flowchart illustrating one embodiment is shown in FIG. 3. In this embodiment, an eye defect is said to be white or golden if it is bright, for example, in Lab color space the local average luminance l is higher than 100, and is not too saturated, for example, in Lab color space, the absolute value of a and b parameters does not exceed 15.

Initially, the luminance of each pixel of an acquired image 250 to be corrected is determined and a selection of all the pixels whose luminance is larger than a threshold value is made, 300. In the preferred embodiment, the acquired image is in RGB space and the intensity is calculated as I=max[R,G] and the intensity threshold value is 220. Also, to avoid highly-saturated colors (such as pure red or pure green) the saturation computed as abs(R−G) is compared to a threshold of 35, and discarded if higher. As such, only high-luminance pixels are retained, which provide seeds for a future region growing procedure.

In alternative implementations, the formula for luminance can be taken as the Y value for an image in YCbCr space. However it will be appreciated that luminance can be taken as the L value for an image in CIE-Lab space or indeed any other suitable measure can be employed.

The selected pixels are then labeled 310. This involves identifying selected pixels neighboring other selected pixels and labeling them as luminous regions of connected selected pixels.

These luminous regions are then subjected to a plurality of geometrical filters 320 in order to remove luminous regions, which are not suitable candidates for white eyes.

In the preferred embodiment, the regions first pass through a size filter 321 for removing regions whose size is greater than an upper limit. The upper limit is dependent on the size of the image, and in an embodiment, the upper limit is 100 pixels for a 2 megapixel image.

Filtered regions then pass through a shape filter 322, which removes all suitably sized luminous regions, which are not deemed round enough. The roundness of the luminous regions is assessed by comparing the ratio of the two variances along the two principal axes with a given threshold. Regions such as those comprising less than approximately 5-10 pixels, are exempt from passing through the shape filter, as for such small regions, shape is irrelevant.

Filling factor 323 is a process that removes empty regions bounded by the luminous regions if certain criteria are met. In the preferred embodiment, the ratio of the area of a luminous region to the area of the bounded empty region is determined and if this ratio is below a certain threshold, for example, 0.5 in one embodiment, the luminous region is removed.

The remaining luminous regions are finally passed through a skin filter 324 and a face filter, 325 to prevent white spots being mis-detected as white eyes based on the fact that they neighbor something that is not characteristic of the human face or skin color.

Skin around white-eye tends to be under-illuminated and turn slightly reddish. A wide palette of skin prototypes is maintained for comparison with the pixels of the luminous regions. For each luminous region, the ratio of pixels, characteristic to the human skin, to pixels, which are not characteristic to the human skin, in a bounding box, is computed and compared to a threshold value. In the preferred embodiment, the threshold is quite restrictive at 85-90%.

Similarly, a wide palette of possible face colors is maintained for comparison with the pixels of the luminous regions. For each luminous region, the ratio of pixels, characteristic to the human face, to pixels, which are not characteristic to the human face, in a bounding box, is computed and compared to a threshold value. In the preferred embodiment, the threshold is quite restrictive at 85-90%. If the imposed percentage is met or exceeded, the region proceeds to the step of region growing, 330.

Region growing 330 begins by selecting the brightest pixel of each successfully filtered luminous region as a seed. Each neighbor of the seed is examined to determine whether or not it is a valley point. A valley point is a pixel that has at least two neighboring pixels with higher intensity values, located on both sides of the given pixel in one of its four main directions (horizontal, vertical and its two diagonals). As illustrated below in table 1, the central pixel with intensity 99 is a valley point because it has two neighbors in a given direction that both have greater intensity values. Table 2 illustrates a central pixel, 99, which is not a valley point because there is no saddle configuration on one of the four main directions.

TABLE 1

| 100 | 98  | 103 |
|-----|-----|-----|
| 70  | 99  | 104 |
| 104 | 105 | 98  |

TABLE 2

| 100 | 98  | 103 |
|-----|-----|-----|
| 70  | 99  | 104 |
| 98  | 105 | 98  |

Starting from the seed, an aggregation process examines the seed pixel's neighbors and adds these to the aggregated region provided that they are not valley points. This examination and aggregation process continues until there are no non-valley neighbors left unchecked or until a maximum threshold size is reached. If a maximum threshold size is reached, the region is deemed not to be a white eye and no further testing is carried out on this region.

The outcome of this stage is a number of aggregated regions, which have been grown from the brightest points of each previously defined and filtered luminous region, and aggregated according to the valley point algorithm. It will be seem however that in alternative implementations, aggregation could take place before filtering and so the filters 320 could be applied to aggregated regions rather than luminous regions.

A number of computations are then carried out on these aggregated regions 340.

The roundness of the aggregated region is calculated 341 as R=perimeter2/(4·π·Area), where R≧1. R=1 for the perfect circle, and thus the larger the R value, the more elongated the shape. White-eyes should be round and so must be characterized by a value of R that does not exceed a certain threshold value. In the preferred embodiment, the threshold value for R is a function of eye's size. Thus we expect an eye to be rounder as its size increases (the smaller the eye, the poorer the approximation of its shape by a circle, and the less accurate the circle representation in the discrete plane). Three thresholds are used in the preferred embodiment (for a 2 megapixel image—these will scale linearly for larger/smaller image sizes):

R=1.1 for large eye (i.e., size between 65 and 100 pixels—for a 2 megapixel image);

R=1.3 for medium-sized eyes (size between 25 and 65 pixels); and

R=1.42 for small eyes (size less than 25 pixels).

The contrast of the aggregated regions is then computed 342 as the ratio of the average intensity of the valley points delimiting the aggregated region to the maximum intensity value inside the region, i.e. the intensity of the brightest seed point from step 330. As small white eyes occur normally in low illumination conditions, the contrast should be high.

Most of the small white-eyes have a yellowish hue meaning that they have at least some pixels characterized by high values of the b component in Lab space. Therefore the maximum value of b, bmax, is a good discriminator between actual white-eyes and for instance, eye glints or other point-like luminous reflections.

In one embodiment, the pixels being processed are in RGB color space. In order to obtain a value for the b component, the aggregated regions are transformed from RGB color space to Lab color space.

The maximum value of the b component, $b_{max}$, in Lab colour space is then calculated and compared with a threshold, $b_{threshold}$, at 343. If $b_{max} \geq b_{threshold}$, the average saturation in the region is then computed at 344. Otherwise, the aggregated region is deemed not to be white-eye.

The average saturation in the aggregated region is computed as: $S=\sqrt{(a2+b2)}$ 344. White-eyes are more colored than other regions and as such the region's average saturation must exceed a threshold in order for a candidate region to be declared white-eye at 350. Aggregated regions passing the tests outlined above are labeled white-eyes and undergo a correction procedure 399 according to the preferred embodiment for the present invention.

The correction procedure comprises setting the intensity I in LAB space, of the aggregated region's points to the average intensity of the valley points delimiting the region as used in the contrast calculation at 342. In the preferred embodiment, the whole aggregated region is then smoothed by applying a 3×3 averaging filter.

According to a further embodiment, there is provided a method for automatic detection and correction of large white eyes, as depicted in the flowchart of FIG. 4. The main characteristics of large white eyes is that by being very well defined, their shape is round and they are well separated from the iris.

Referring to FIG. 4, it can be seen that the first five stages of the large white-eye automatic detection process, thresholding 400, labeling, 410, size filter 430, shape filter 440 and filling factor 450, are identical to those of the small white-eye automatic detection process as described above. However, it will be seen that the threshold applied in the size filter 430 will be larger than for the step 322 and that different parameters may also be required for the other stages.

Nonetheless, once the luminous regions have passed through the geometrical filters 420, the next steps determine and analyze the edges of the suspected large white-eyes.

First, an intensity gradient of each luminous region is computed 460. The gradient is calculated from a grey-scale version of each luminous region as depicted in FIG. 5(*a*). Gradient is any function that has a high response at points where image variations are great. Conversely, the response of the gradient is low in uniform areas. In the preferred embodiment, the gradient is computed by linear filtering with two kernels, one for the horizontal gradient, Gx, and one for the vertical gradient, Gy. The modulus of the gradient is then computed as G=sqrt(Gx2+Gy2) and is further thresholded to obtain edge points and produce a binary edge-image as depicted in FIG. 5(*b*). In the preferred embodiment, step 460 is carried out using a simple Sobel gradient. However it will be appreciated that any gradient function such as Prewitt or Canny may be used.

Once the edges of the suspected large white-eye regions have been determined, a Hough Transform is performed on each gradient image, 470. A Hough Transform detects shapes that can be parameterized, for example, lines, circles, ellipses etc and is applied to binary images, usually computed as edge maps from intensity images. The Hough Transform is based on an alternative space to that of the image, called accumulator space. Each point (x,y) in the original image contributes to all points in the accumulator space, in this case, corresponding to the possible circles that may be formed to contain the (x,y) point. Thus, all points corresponding to an existing circle in the original edge-image will all contribute to that point in the accumulator space corresponding to that particular circle.

Next, the most representative circle as produced by the Hough Transform must be detected for each region, 480. This step comprises inspecting the points in the Hough accumulator space, which have a significant value. This value is dependent on the number of points in the original edge image, which contribute to each point in the accumulator space. If no representative circle is found, there is deemed to be no large white eye present in that region of the image.

However, if a high value point is found, then the corresponding circle in the original image is checked and a verification of the circle 490 is carried out.

This involves checking for example whether the most representative circle encircles the original seed point for the luminous region and/or whether the average gradient along the circle exceeds a threshold.

If a circle of a luminous region is verified, the region is corrected, 499, by darkening the pixels in the interior of the circle. In the preferred embodiment, the intensity of the pixels is set to 50 and an averaging filter is applied.

Preferably, however, the correction also takes into account the possibility of the luminous region including a glint, which should not be darkened. In RGB space, glint candidates are selected as high luminance pixels (min(R, G)$\geq$=220 and max(R, G)=255). If a very round (both in aspect ratio and elongation), luminous, and desaturated region is found within the interior of a luminous region, its pixels are removed from the luminous region pixels to be corrected.

In the case where further eye-color information is available, for example in the case where person-recognition procedures are available with a database of previously captured images, the additional color information stored with that person's information in the database can be advantageously incorporated into the correction of both large and small white-eye.

In methods that may be performed according to preferred embodiments herein and that may have been described above and/or claimed below, the operations have been described in selected typographical sequences. However, the sequences have been selected and so ordered for typographical convenience and are not intended to imply any particular order for performing the operations.

In addition, all references cited above herein, in addition to the background and summary of the invention sections, are hereby incorporated by reference into the detailed description of the preferred embodiments as disclosing alternative embodiments and components. The following references are also incorporated by reference:

U.S. patent application Ser. Nos. 11/462,035, 11/282,955, and

U.S. published patent applications nos. 2002/0136450, 2005/0047655, 2004/0184670, 2004/0240747, 2005/0047656, 2005/0041121, 2005-0140801, 2005-0031224; and U.S. Pat. No. 6,407,777.

The present invention is not limited to the embodiments described herein, which may be amended or modified without departing from the scope of the present invention.

What is claimed is:

1. A method for detecting flash eye defects in an image, comprising using a processor in performing the following:

defining one or more luminous regions in said image, each region having at least one pixel having luminance above a luminance threshold value;

grouping neighboring selected pixels into said one or more luminous regions;

for each of said one or more luminous regions, applying a face filter for determining a probability that said region is located within a region of an image characteristic of a face;

for each region determined as having at least a threshold probability of being within a face, determining a further probability whether said region has a size, shape or color, or combinations thereof, characteristic of a pupil region of an eye region of a face;

for each region having at least a further threshold probability of having a size, shape or color, or combinations thereof, characteristic of a pupil region of an eye region of a face, determining whether said region corresponds to a flash eye defect including determining that said region does correspond to a candidate flash eye defect region upon determining that a flash was used when the image was acquired, or that said region does not correspond to a flash eye defect region upon determining that a flash was not used when the image was acquired; and storing, displaying, transmitting, or printing said image or a corrected or further processed version of said image, or combinations thereof.

2. A method according to claim 1, wherein said defining comprises selecting pixels of the image which have a luminance above a luminance threshold value and a redness above or below a redness threshold value.

3. The method according to claim 1, further comprising correcting said flash eye defect.

4. The method according to claim 1, further comprising applying a filter for adding pixels to a luminous region located with said luminous region and which have luminance below said luminance threshold value or a redness above or below a redness threshold value.

5. The method of claim 1, wherein said shape comprises roundness, and the method further comprises calculating said roundness to determine if said region corresponds to an eye feature.

6. The method according to claim 1, further comprising, for each luminous region, determining a corresponding aggregated region by: (i) determining a seed pixel for said aggregated region within a luminous region; and (ii) iteratively adding non-valley neighbouring pixels to said aggregated region until no non-valley neighboring pixels adjacent to said aggregated region remain.

7. The method according to claim 1, further comprising calculating an intensity gradient of each luminous region.

8. A digital image processing device operable to detect flash eye defects in an image, and comprising a controller arranged to:

define one or more luminous regions in said image, each region having at least one pixel having luminance above a luminance threshold value;

group neighboring selected pixels into said one or more luminous regions;

for each of said one or more luminous regions, apply a face filter for determining a probability that said region is located within a region of an image characteristic of a face;

for each region determined as having at least a threshold probability of being within a face, determine a further probability whether said region has a size, shape or color, or combinations thereof, characteristic of a pupil region of an eye region of a face;

for each region having at least a further threshold probability of having a size, shape or color, or combinations thereof, characteristic of a pupil region of an eye region of a face, determine whether said region corresponds to a flash eye defect including determining that said region does correspond to a candidate flash eye defect region opon determining that a flash was used when the image was acquired, or that said region does not correspond to a flash eye defect region upon determining that a flash was not used when the image was acquired; and store, display, transmit, or print said image or a corrected or further processed version of said image, or combinations thereof.

9. A device according to claim 8, comprising: a digital camera or camera phone, a general purpose, portable or handheld computer, a printer or a digital scanner, or combinations thereof.

10. One or more digital storage devices having executable program code embodied thereon for programming one or more processors to perform a method of correcting a flash eye defect in a digital image, the method comprising:

acquiring a digital image;

determining a luminance of pixels within the digital image;

selecting those pixels having a luminance above a certain threshold as candidate regions for correction of a flash eye defect;

defining one or more luminous regions in said image, including determining that each region has each of the following:

at least a threshold probability of having a size, shape or color, or combinations thereof, characteristic of a pupil region of an eye region of a face; and at least one pixel having luminance above a luminance threshold value; and determining that said region does correspond to a candidate flash eye defect region, upon determining that a flash was used when the image was acquired, or that said region does not correspond to a flash eye defect region upon determining that a flash was not used when the image was acquired;

filtering the selected pixels; and correcting the white eye defect for non-filtered pixels among the selected pixels.

11. The one or more storage devices of claim 10, wherein the filtering comprises geometrical filtering of pixels based on a size or shape or both of a selected pixel region.

12. The one or more storage devices of claim 10, wherein the filtering comprises geometrical filtering of pixels based on a size of a selected pixel region being above a threshold size.

13. The one or more storage devices of claim 10, wherein the correcting comprising calculating a roundness of a selected pixel region, and correcting the roundness if it does not exceed a certain threshold value of roundness.

14. The one or more storage devices of claim 10, wherein the filtering comprises checking whether an average saturation of a selected pixel region exceeds a certain threshold saturation, and correcting the selected pixel region only if the threshold is exceeded.

15. The one or more storage devices of claim 10, the method further comprising: (i) selecting a bright pixel as a seed pixel; and (ii) aggregating outwardly from the seed pixel to combine those pixels that are not valley points with the seed pixel as an aggregated region until a minimum number of non-valley neighbors are left or a threshold size is reached, or a combination thereof.

16. The one or more storage devices of claim 15, the method further comprising smoothing the aggregated region.

17. The one or more storage devices of claim 15, the method further comprising computing an intensity gradient for one or more candidate regions.

18. The one or more storage devices of claim 10, the method further comprising filtering a candidate region that comprises merely a glint.

19. The one or more storage devices of claim 10, the method further comprising detecting and correcting a red eye defect within the digital image.

20. The method of claim 1, further comprising applying a glint filter that filters any candidate region that comprises merely a glint.

21. The device of claim 8, wherein the controller is further arranged to apply a glint filter that filters any candidate region that comprises merely a glint.

22. The one or more storage devices of claim 10, wherein the defining further including determining that each luminous region has a measure of redness below a redness threshold value determined as a ratio of a red component value of the at least one pixel to one or both of a blue component value and a green component value of the at least one pixel.

23. The method of claim 1, further comprising determining a further probability that each luminous region has a measure of redness below a redness threshold value determined as a ratio of a red component value of the at least one pixel to one or both of a blue component value and a green component value of the at least one pixel.

24. The device of claim 8, wherein the controller is further arranged to determining a further probability that each luminous region has a measure of redness below a redness threshold value determined as a ratio of a red component value of the at least one pixel to one or both of a blue component value and a green component value of the at least one pixel.

* * * * *